(12) United States Patent
Zahirovic et al.

(10) Patent No.: US 11,410,614 B2
(45) Date of Patent: *Aug. 9, 2022

(54) SYSTEM AND METHOD FOR LOADING IMAGE CORRECTION DATA FOR DISPLAYS

(71) Applicant: Ignis Innovation Inc., Waterloo (CA)

(72) Inventors: Nino Zahirovic, Waterloo (CA); Shuenn-Jiun Tang, Guelph (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,228

(22) Filed: Jul. 13, 2020

(65) Prior Publication Data

US 2020/0342817 A1 Oct. 29, 2020

Related U.S. Application Data

(63) Continuation of application No. 15/597,947, filed on May 17, 2017, now Pat. No. 10,714,018.

(51) Int. Cl.
*G09G 3/3275* (2016.01)
*G09G 3/3208* (2016.01)
*G09G 3/20* (2006.01)
*G09G 5/10* (2006.01)
*H04N 5/57* (2006.01)

(52) U.S. Cl.
CPC ......... *G09G 3/3275* (2013.01); *G09G 3/2096* (2013.01); *G09G 3/3208* (2013.01); *G09G 5/10* (2013.01); *H04N 5/57* (2013.01); *G09G 2300/0408* (2013.01); *G09G 2320/0233* (2013.01); *G09G 2320/0285* (2013.01); *G09G 2320/043* (2013.01); *G09G 2330/026* (2013.01); *G09G 2330/08* (2013.01);
(Continued)

(58) Field of Classification Search
CPC .. G09G 3/3275; G09G 3/3208; G09G 3/2096; G09G 5/10; G09G 2320/0285; G09G 2370/04; G09G 2370/02; G09G 2330/026; G09G 2320/043; G09G 2330/12; G09G 2360/08; G09G 2300/0408; G09G 2320/0233; G09G 2330/08; G09G 3/3225; G09G 2300/0842; H04N 5/57
See application file for complete search history.

(56) References Cited

U.S. PATENT DOCUMENTS

| | | | |
|---|---|---|---|
| 10,714,018 B2 * | 7/2020 | Zahirovic | G09G 5/10 |
| 2007/0290958 A1 * | 12/2007 | Cok | G09G 3/3225 345/77 |

(Continued)

*Primary Examiner* — Grant Sitta
(74) *Attorney, Agent, or Firm* — Stratford Group Ltd.

(57) ABSTRACT

Active-Matrix Organic Light-Emitting Diode (AMOLED) displays exhibit differences in luminance on a pixel to pixel basis, primarily as a result of process or construction inequalities, or from aging caused by operational use over time. To facilitate image correction, the initial non-uniformity correction data is obtained using methods, such as electrical measurement or a combination of electrical and optical measurement. Typically, the correction data is then stored on a non-volatile-memory chip on the display module itself. The proposed invention offers an alternate method for storing and loading the image correction data, thereby eliminating the need for memory chip in the display module.

20 Claims, 7 Drawing Sheets

(52) U.S. Cl.
CPC ..... *G09G 2330/12* (2013.01); *G09G 2360/08* (2013.01); *G09G 2370/02* (2013.01); *G09G 2370/04* (2013.01)

(56) References Cited

U.S. PATENT DOCUMENTS

| | | | |
|---|---|---|---|
| 2014/0118558 A1* | 5/2014 | Imoto | G09G 3/3208 348/181 |
| 2015/0009126 A1* | 1/2015 | Nagara | B60R 16/023 345/156 |
| 2017/0124947 A1* | 5/2017 | Kim | G09G 3/3233 |

* cited by examiner

SYSTEM AND METHOD FOR LOADING IMAGE CORRECTION DATA FOR DISPLAYS

CROSS REFERENCE TO RELATED APPLICATION

This application is a continuation of and claims benefit to U.S. patent application Ser. No. 15/597,947, filed May 17, 2017, now allowed, which is hereby incorporated by reference in its entirety.

FIELD OF THE INVENTION

The present invention relates to image correction for displays, and in particular to a system and method for loading and saving image correction data for displays.

BACKGROUND OF THE INVENTION

Active-Matrix Organic Light-Emitting Diode (AMO-LED) displays are well known in the art. Polysilicon and metal oxide semiconductor are popular materials used in the AMOLED displays, due to their low cost and well established infrastructure from thin-film transistor liquid crystal display (TFT-LCD) fabrication.

Typically, LED and AMOLED displays require some form of image correction post fabrication. All LED and AMOLED displays, regardless of backplane technology, exhibit differences in luminance on a pixel to pixel basis, primarily as a result of process or construction inequalities, or from aging caused by operational use over time. Luminance non-uniformities in a display may also arise from natural differences in chemistry and performance from the LED and OLED materials themselves. These non-uniformities must be managed by the LED and AMOLED display electronics in order for the display device to attain commercially acceptable levels of performance for mass-market use.

To facilitate image correction, for a given display, the initial non-uniformity correction data is typically acquired optically from the display, at the module level, prior to or after singularization. Other methods, such as electrical measurement or a combination of electrical and optical measurement, may also be used to acquire the correction data. The correction data is then stored on a non-volatile-memory (NVM) chip on the display module itself, as disclosed in U.S. Pat. No. 7,868,857, which is incorporated herein by reference. The extra NVM memory chip adds to the cost of the display module, and consumes valuable power and circuit board surface area.

An object of the present invention is to overcome the shortcomings of the prior art by providing a method of storing and loading the image correction data remote from the display module, thereby eliminating the need for NVM in the product.

SUMMARY OF INVENTION

Accordingly, the present invention relates to a method of loading image correction data for a display system used in a final product comprising:

determining initial correction data for the display system to correct for initial non-uniformity prior to assembly in the final product;

storing the initial correction data in a remote memory separate from the display system and the final product;

assembling the final product including the display system, and a memory store remote from the display system;

downloading the initial correction data from the remote memory and storing the initial correction data in the memory store on the final product; and transmitting the initial correction data from the memory store to the display system for correcting the display system.

The present invention also relates to a display system for use in a video displaying product, which includes a video source and a memory store including initial correction data for the display system, the display system comprising:

a digital data processor for receiving luminance data in digital form from the video source over a video interface;

a data driver IC for converting the luminance data from digital form to voltage or current form;

a plurality of pixel circuits, each including a thin film transistor (TFT) and an organic light-emitting diode (OLED) for converting the voltage or current into visible light;

a compensation module capable of requesting the initial correction data from the memory store remote from the display system, receiving the initial correction data from the memory store over the video interface; and adjusting the luminance data to correct the display system using the initial correction data.

BRIEF DESCRIPTION OF THE DRAWINGS

The invention will be described in greater detail with reference to the accompanying drawings which represent preferred embodiments thereof, wherein.

DETAILED DESCRIPTION OF THE INVENTIONS

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
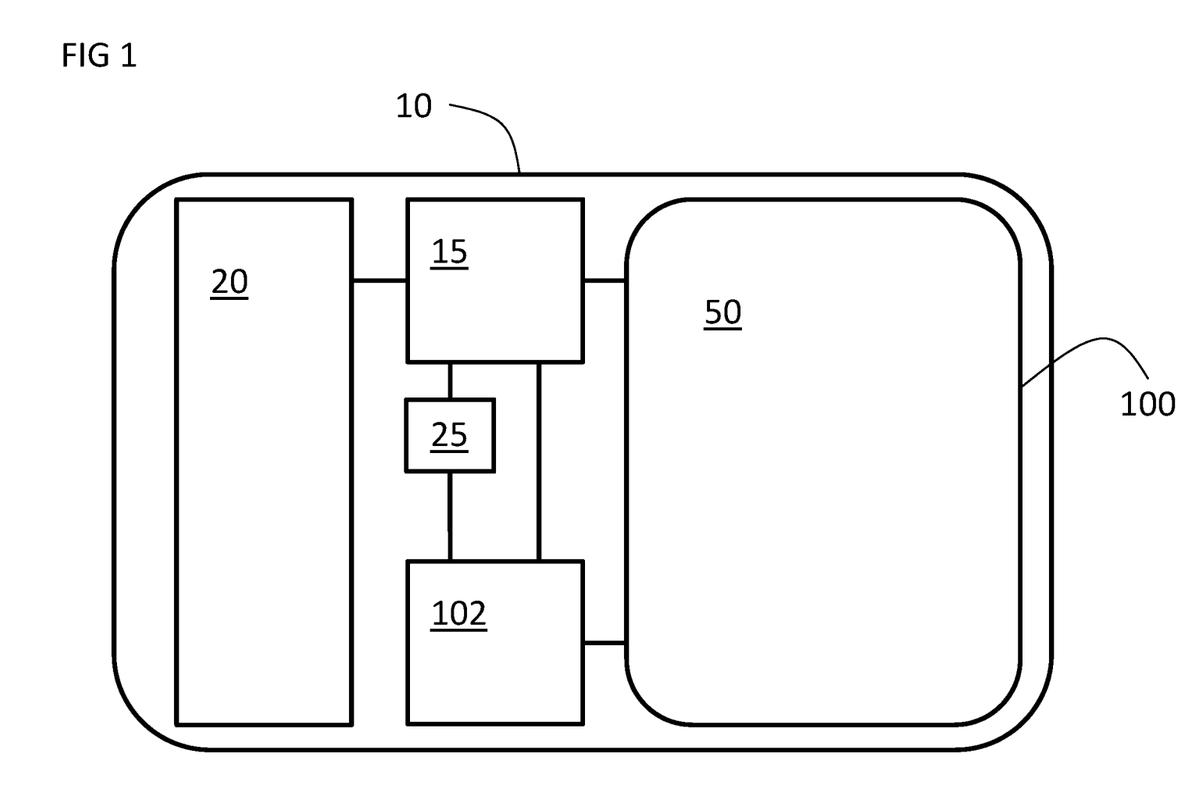
FIG. 1 is a schematic diagram of a final product including the display system in accordance with the present invention.

FIG. 1 illustrates a product or test system 10 in which a light emitting display system 100 of the present invention is installed. The product or test system 10 may include a control processor 15 for controlling the various systems of the product 10, and a user interface 20 for manually inputting instructions to the control processor 15. The user interface 20 may be integrated into the display system 100 or a separate entity. A memory store 25, such as an eMMC flash may be provided for storing control software, application software, and other data of a more personal nature, e.g. photographs, videos etc. A video source 102 is provided for transmitting luminance data to the display system 100 for display 50.

Figure 2:
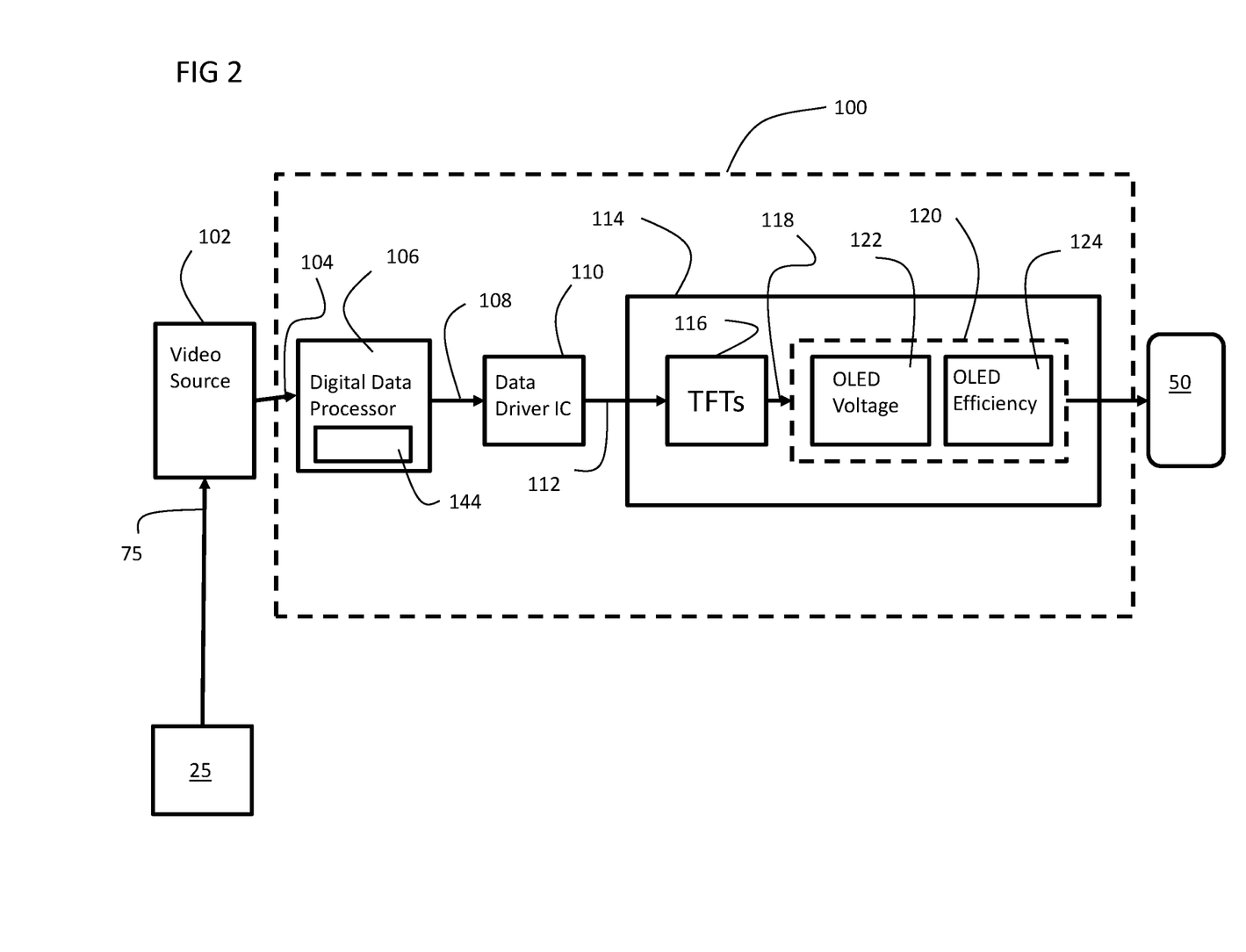
FIG. 2 is a schematic diagram of the display system of FIG. 1.

FIG. 2 illustrates the system and the operation of a light emitting display system 100 to which a compensation scheme in accordance with an embodiment of the present invention is applied. The video source 102 contains or transmits luminance data for each pixel in the display system 100, and sends the luminance data in the form of digital data 104 to a digital data processor 106. The digital data processor 106 may perform some data manipulation functions, such as scaling the resolution or changing the color of the display 100. The digital data processor 106 may include one or more of an application processor system on chip (AP-SOC), a central processing unit (CPU), a graphics processor unit (GPU).

The digital data processor 106 sends digital data 108 to a data driver IC 110. The data driver IC 110 converts the digital data 108 into an analog voltage or current 112. The analog voltage or current 112 is applied to a pixel circuit 114. The pixel circuit 114 includes thin film transistors (TFTs) 116 and a light-emitting diode (LED) or an organic light-emitting diode (OLED), hereinafter referred to as LED 120. The TFTs 116 convert that voltage or current 112 into another current 118 which flows through the LED 120. The LED 120 converts the current 118 into visible light 126. The LED 120 has an LED voltage 122, which is the voltage drop across the LED 120. The LED 120 also has an efficiency 124, which is a ratio of the amount of light emitted to the current through the LED 120. The pixel circuit 114 outputs the visible light 126 based on the analog voltage or current 112 for viewing by the user.

The digital data 104, the analog voltage/current 112, the current 118, and the visible light 126 all contain the exact same information, i.e. luminance data. They are simply different formats of the initial luminance data that came from the video source 102. The desired operation of the system is for a given value of luminance data from the video source 102 to always result in the same value of the visible light 126. In FIG. 2, one pixel circuit 114 is shown as an example; however, the light emitting display system 100 includes a plurality of pixel circuits 114.

However, there are several degradation factors which may cause errors on the visible light 126. Initial differences in luminance on a pixel to pixel basis are primarily as a result of process or construction inequalities. Luminance non-uniformities in a display system 100 may also arise from natural differences in chemistry and performance from the LED and OLED materials themselves. Moreover, with continued usage, the TFTs 116 will output lower current 118 for the same input from the data driver IC 110. With continued usage, the LED 120 will consume greater voltage 122 for the same input current 118. Because the TFTs 116 are not perfect current sources, this will actually reduce the input current 118 slightly. With continued usage, the LED 120 will lose efficiency 124, and emit less visible light 126 for the same input current 118.

Due to these degradation factors, the visible light output 126 will be less over time, even with the same luminance data being sent from the video source 102. Depending on the usage of the display, different pixels may have different amounts of degradation. Therefore, there will be an ever-increasing error between the required brightness of some pixels as specified by the luminance data in the video source 102, and the actual brightness of the pixels. The result is that the desired image will not show properly on the display 50.

Initial Non-Uniformity

Figure 3:
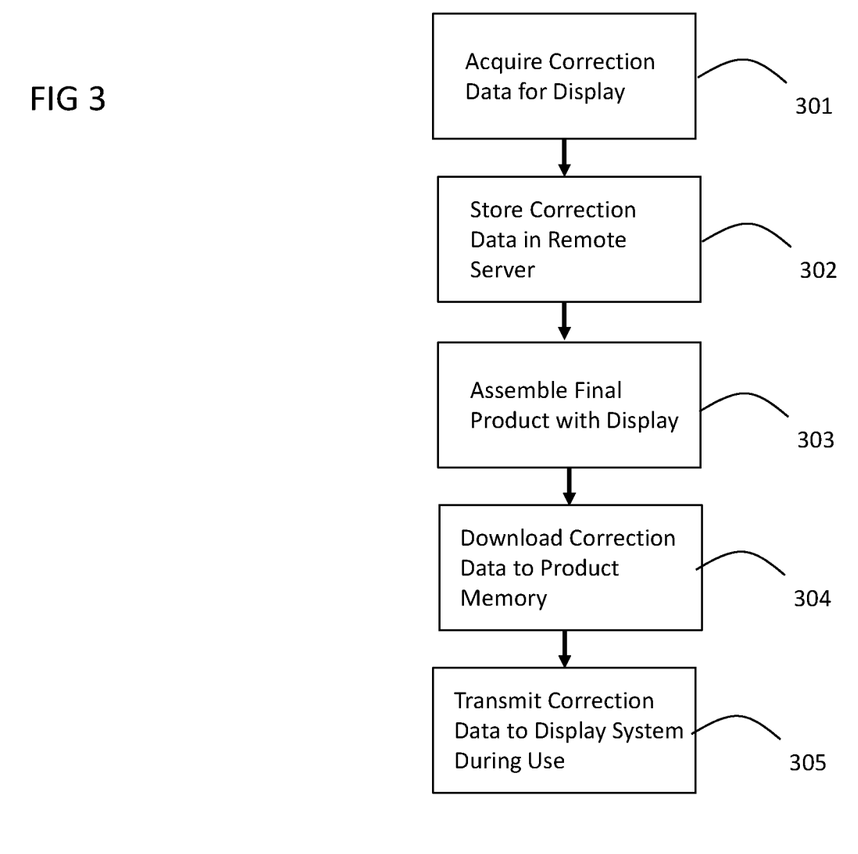
FIG. 3 is a flow chart of the method of the present invention.

With reference to FIG. 3, to facilitate image correction for the display system 100, initial non-uniformity correction data 75 is acquired during initial assembly or manufacture of the display system 100 (Step 301). The correction data 75 is typically acquired optically from the display, at the module level, prior to or after singularization of the pixels 114. Other methods, such as electrical measurement or a combination of electrical and optical measurement, may also be used to acquire the correction data 75.

In order to remove the need for a separate NVM memory in the display system 100, the producer of the display system 100 may serialize the display system 100 and store the correction data in a network-connected or cloud server, i.e. remote from display system 100 and final product 10 (Step 302). When the display system 100 is integrated into the final product or the test system 10 (Step 303) the integrator may pull the correction data 75 from the network connector or cloud server and store onto the memory store 25 of the final product or test system 10 (Step 304). Typically, the final product 10 will have a large and relatively low-cost memory store 10, i.e. in terms of $/bit, available, such as an eMMC flash.

On power-on, a software driver running on the final product or test system 10 can load the correction data 75 from the large, low-cost memory store 25 and populate a correction data table inside of a compensation module 144 in the digital data processor 106, the display driver IC 110 or a discrete processing chip in the display system 100 using the same high speed video interface used for video data from the video source 102 (Step 305). The correction data 75 may be used by the compensation module 144 as part of the application processor, the GPU or the CPU of the digital data processor 106 or by the discrete compensation processing chip to correct the luminance data in its digital form 104 or 108. Alternatively, the compensation module 144 may be part of the display driver IC 110, and use the luminance data in digital form 108 or voltage or current form 112. The high speed video interface transfer speeds available between the video source 102 of the final product 10 and the digital data processor 106/display driver 110 enable fast correction data table loading. The correction data 75 and the luminance data 104 may be transmitted simultaneously over the video interface or the correction data 75 may be transmitted as part of the luminance data 104 over the video interface.

Besides the table upload speed, the final product 10 would not require any flash memory on the display module 100 as the memory store 25 of the final product 10 could be leveraged thus saving cost as well.

The initial non-uniformity correction data 75 may be stored in the memory 25 as an integer value. The location of each integer in the memory 25 is related to the pixel's location on the LED or AMOLED display 50. The value of each integer is a number, which is added to the digital luminance data 104 by the compensation module 144 to compensate for the initial non-uniformity.

For example, digital luminance data may be represented to use 8-bits (256 values) for the brightness of a pixel. A value of 256 may represent maximum luminance for the pixel 114. A value of 128 may represent approximately 50% luminance. The value in the compensation table of the memory 25 may be the number that is added to the luminance data 104 to compensate for the non-uniformity. Therefore, the compensation module 144 in the digital data processor 106 may be implemented by a digital adder. It is noted that digital luminance data 104 may be represented by any number of bits, depending on the driver IC 110 used, for example, 6-bit, 8-bit, 10-bit, 14-bit, etc.

Degradation

Figure 4:
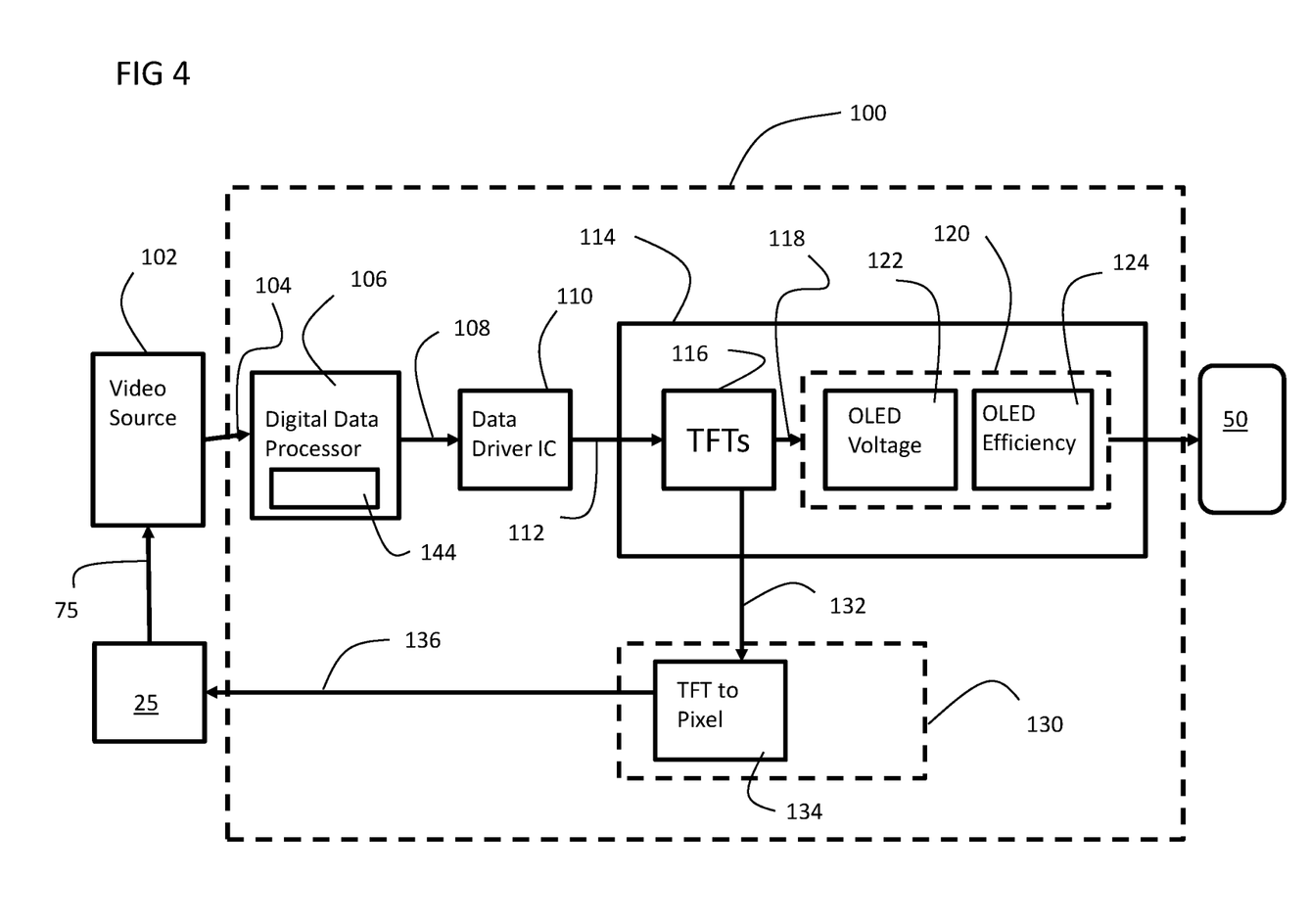
FIG. 4 is a schematic diagram of an alternate embodiment of the display system of FIG. 1.

With reference to FIG. 4, to help mitigate the degradation over time and update the initial non-uniformity correction data 75 to become compensation data 136, a compensation functions module 130 is provided with the display 50. The compensation functions module 130 includes a module 134 for implementing an algorithm, referred to as TFT-to-pixel circuit conversion algorithm, based on degradation data 132 from the pixel circuit 114. The degradation data 132 may be measured TFT degradation data or measured TFT and LED degradation data. The module 134 outputs calculated pixel circuit degradation (compensation) data 136 to the digital data processor 106.

The degradation data 132 is electrical data which represents how much a part of the pixel circuit 114 has been degraded. The data measured from the pixel circuit 114 may represent, for example, one or more characteristics of a part of the pixel circuit 114.

The degradation data 132 is measured from, for example, one or more thin-film-transistors (TFTs), an light emitting diode (LED), an organic light emitting diode (OLED), or a combination thereof. It is noted that the transistors of the pixel circuit 114 is not limited to the TFTs, and the light emitting device of the pixel circuit 114 is not limited to the OLED. The measured degradation data 132 may be digital or analog data. The display system 100 provides compensation data 136 based on measurement from a part of the pixel circuit 114, e.g. TFT 116 or LED 120, to compensate for non-uniformities in the display 50. The non-uniformities may include brightness non-uniformity, color non-uniformity, or a combination thereof. Factors for causing such non-uniformities may include, but not limited to, process or construction inequalities in the display, aging of pixel circuits, etc.

The degradation data 132 may be measured initially during manufacture or assembly, at a regular time interval, e.g. daily, weekly or monthly, or at a dynamically regulated time interval, e.g. upon request of user. The calculated pixel circuit degradation data 136 may be compensation data to correct non-uniformities in the display 50. The calculated pixel circuit degradation (compensation) data 136 may include any parameter to produce compensation. The compensation data 136 may be used at a regular time interval, e.g. each frame, regular interval, etc, or at a dynamically regulated timing. The measured degradation data 132, the compensation data 136 or a combination thereof may be stored in the memory store 25.

The TFT-to-pixel circuit conversion algorithm module 134 or the combination of the TFT-to-pixel circuit conversion algorithm module 134 and the digital data processor 106 estimates the degradation of the entire pixel circuit 114 based on the measured degradation data 132. Based on this estimation, the entire degradation of the pixel circuit 114 is compensated by adjusting, at the digital data processor 106, the luminance data (digital data 104) applied to a certain pixel circuit(s).

The display system 100 may modify or adjust the luminance data 104 applied to a degraded pixel circuit 114 or non-degraded pixel circuit 114. For example, if a constant value of visible light 126 is desired, the digital data processor 106 increases the luminance data for a pixel that is highly degraded, thereby compensating for the degradation.

In FIG. 4, the TFT-to-pixel circuit conversion algorithm module 134 is provided separately from the digital data processor 106. However, the TFT-to-pixel circuit conversion algorithm module 134 may be integrated into the digital data processor 106.

The system 100 of FIG. 4 measures the degradation of the TFTs 116 only. The degradation of the TFTs 116 and the LED 120 are usage-dependent, and the TFTs 116 and the LED 120 are always linked in the pixel circuit 114. Whenever the TFT 116 is stressed, the LED 120 is also stressed. Therefore, there is a predictable relationship between the degradation of the TFTs 116, and the degradation of the pixel circuit 114 as a whole. The TFT-to-pixel circuit conversion algorithm module 134 or the combination of the TFT-to-pixel circuit conversion algorithm module 134 and the digital data processor 106 estimates the degradation of the entire pixel circuit 114 based on the TFT degradation only. The embodiment of the present invention may also be applied to systems that monitor both TFT and LED degradation independently.

The pixel circuit 114 has a component that can be measured. The measurement obtained from the pixel circuit 114 is in some way related to the pixel circuit's degradation.

Figure 5:
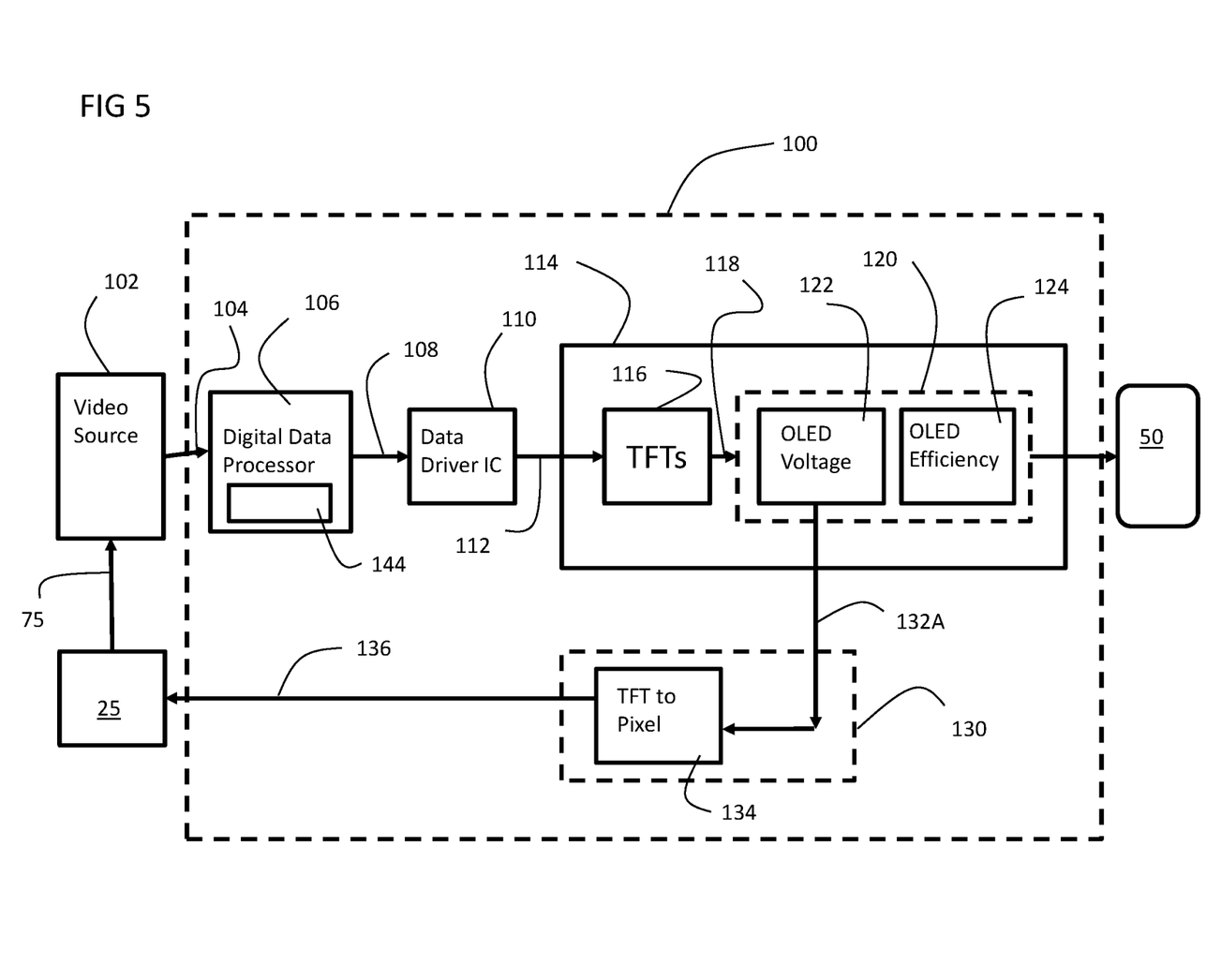
FIG. 5 is a schematic diagram of an alternate embodiment of the display system of FIG. 1.

FIG. 5 illustrates a further example of the system 100 of FIG. 4. The system 100 of FIG. 5 measures the LED voltage 122. Thus, the measured degradation data 132A is related to the TFT 116 and the LED 120 degradation. The compensation functions module 130 of FIG. 3 implements the TFT-to-pixel circuit conversion algorithm 134 on the signal related to both the TFT degradation and LED degradation. The TFT-to-pixel circuit conversion algorithm module 134 or the combination of the TFT-to-pixel circuit conversion algorithm module 134 and the digital data processor 106 estimates the degradation of the entire pixel circuit 114 based on the TFT degradation and the LED degradation. The TFT degradation and LED degradation may be measured separately and independently.

Referring to FIGS. 4 and 5, the pixel circuit 114 may allow the current out of the TFTs 116 to be measured, and to be used as the measured TFT degradation data 132. The pixel circuit 114 may allow some part of the LED efficiency to be measured, and to be used as the measured TFT degradation data 132A. The pixel circuit 114 may also allow a node to be charged, and the measurement may be the time it takes for this node to discharge. The pixel circuit 114 may allow any parts of it to be electrically measured. Also, the discharge/charge level during a given time can be used for aging detection.

Figure 6:
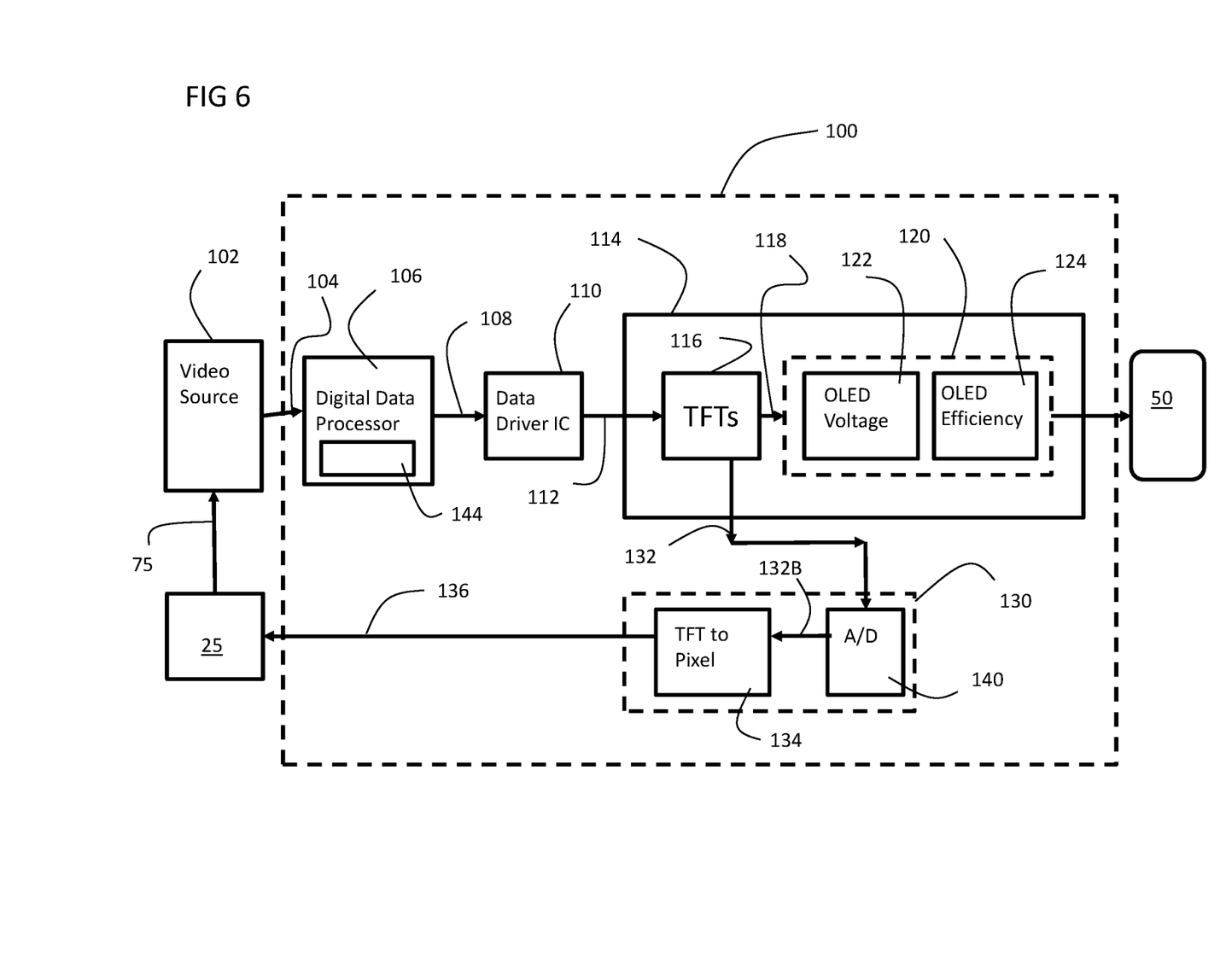
FIG. 6 is a schematic diagram of an alternate embodiment of the display system of FIG. 1.
Figure 7:
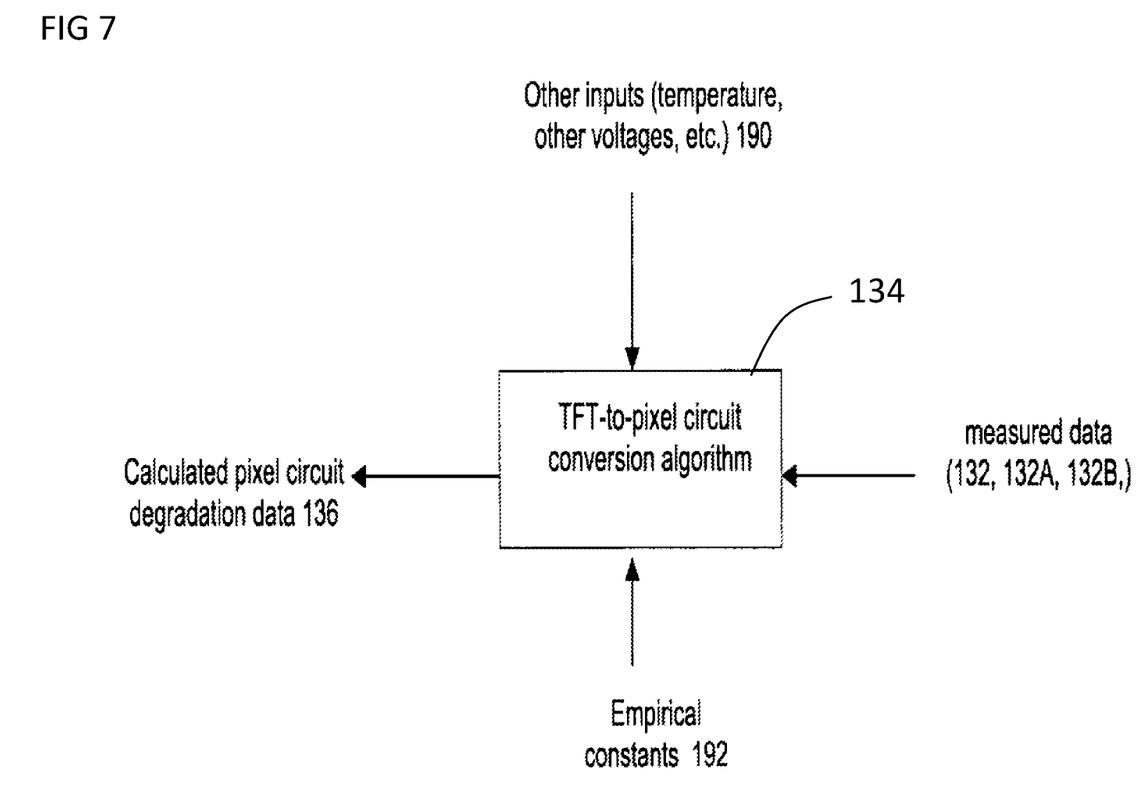
FIG. 7 is a schematic diagram of an alternate embodiment of TFT-to-pixel circuit conversion algorithm module of the display system of FIG. 4, 5 or 6.

Referring to FIG. 6, an example of modules for the compensation scheme applied to the system of FIG. 4 is described. The compensation functions module 130 of FIG. 4 includes an analog/digital (A/D) converter 140. The A/D converter 140 converts the measured TFT degradation data 132 into digital measured TFT degradation data 132B. The digital measured TFT degradation data 132B is converted into the calculated pixel circuit degradation (compensation) data 136 at the TFT-to-Pixel circuit conversion algorithm module 134. The calculated pixel circuit degradation (compensation) data 136 may be stored in the memory 25 separate or in place of the original non-uniformity data 75. Since measuring TFT degradation data from some pixel circuits may take a long time, the calculated pixel circuit degradation data 136 is stored in the memory 25 for use.

In FIG. 6, the TFT-to-pixel circuit conversion algorithm 134 may be a digital algorithm. The digital TFT-to-pixel circuit conversion algorithm 134 may be implemented, for example, on a microprocessor, an FPGA, a DSP, or another device, but not limited to these examples.

The calculated pixel circuit degradation data 136 stored in the memory 25 is always available for the digital data processor 106. Thus, the TFT degradation data 132 for each pixel 114 does not have to be measured every time the digital data processor 106 needs to use the data 132. The degradation data 132 may be measured infrequently in a random or predetermined time period, for example, once a day, once a week etc. Using a dynamic time allocation for the degradation measurement is another case, more frequent extraction at the beginning and less frequent extraction after the aging gets saturated.

The digital data processor 106 may include the compensation module 144 for taking input luminance data for the pixel circuit 114 from the video source 102, and modifying the input luminance data 104 based on degradation data 136 for that pixel circuit 114 or other pixel circuit. In FIG. 6, the module 144 modifies luminance data 104 using the initial non-uniform data 75 and/or the degradation data 136 from the memory 25.

One example of the degradation data 136 used in the module 144 of the digital data processor 106 is illustrated in FIG. 6. The output of the TFT-to-pixel circuit conversion algorithm module 134 is an integer value. This integer is stored in a table in memory 25. The location of each integer in the table is related to the pixel's location on the LED or AMOLED display. Its value is a number, and is added to the digital luminance data 104 to compensate for the degradation.

For example, digital luminance data may be represented to use 8-bits (256 values) for the brightness of a pixel. A value of 256 may represent maximum luminance for the pixel. A value of 128 may represent approximately 50% luminance. The value in the table may be the number that is added to the luminance data 104 to compensate for the degradation. Therefore, the compensation module 144 in the digital data processor 106 may be implemented by a digital adder. It is noted that digital luminance data may be represented by any number of bits, depending on the driver IC 110 used (for example, 6-bit, 8-bit, 10-bit, 14-bit, etc).

In FIGS. 4, 5 and 6, the TFT-to-pixel circuit conversion algorithm module 134 has the measured TFT degradation data 132 or 132A as an input, and the calculated pixel circuit degradation data 136 as an output. However, there may be other inputs to the system to calculate compensation data 136 as well, as illustrated in FIG. 10. In the illustrated embodiment, the TFT-to-pixel circuit conversion algorithm module 134 processes the measured data 132 or 132A based on any one or more of additional inputs 190, e.g. temperature or other voltages, and empirical constants 192.

The additional inputs 190 may include measured parameters, such as voltage reading from current-programming pixels and current reading from voltage-programming pixels. These pixels may be different from a pixel circuit 114 from which the measured signal 132 is obtained. For example, a measurement is taken from a "pixel under test" and is used in combination with another measurement from a "reference pixel". As described below, in order to determine how to modify luminance data 104 to a pixel 114, data from other pixels in the display may be used. The additional inputs 190 may include light measurements, such as measurement of an ambient light in a room. A discrete device or some kind of test structure around the periphery of the panel may be used to measure the ambient light. The additional inputs 190 may include humidity measurements, temperature readings, mechanical stress readings, other environmental stress readings, and feedback from test structures on the panel.

The other parameters may also include empirical parameters 192, such as the brightness loss in the LED 120 due to decreasing efficiency ($\Delta L$), the shift in LED voltage 122 over time ($\Delta Voled$), dynamic effects of Vt shift, parameters related to TFT performance, such as Vt, $\Delta Vt$, mobility ($\mu$), inter-pixel non-uniformity, DC bias voltages in the pixel circuit, changing gain of current-mirror based pixel circuits, short-term and long-term based shifts in pixel circuit performance, pixel-circuit operating voltage variation due to IR-drop and ground bounce.

The TFT-to-pixel-circuit conversion algorithm in the module 134 and the compensation algorithm 144 in the digital data processor 106 work together to convert the measured TFT degradation data 132 into a luminance correction factor. The luminance correction factor has information about how the luminance data 104 for a given pixel 114 is to be modified, to compensate for the degradation in the pixel 114.

In FIG. 6, the majority of this conversion is done by the TFT-to-pixel-circuit conversion algorithm module 134. The module 134 calculates the luminance correction values entirely, and the digital adder 144 in the digital data processor 106 simply adds the luminance correction values to the digital luminance data 104. However, the system 100 may be implemented such that the TFT-to-pixel circuit conversion algorithm module 134 calculates only the degradation values, and the digital data processor 106 calculates the luminance correction factor from that data. The TFT-to-pixel circuit conversion algorithm 134 may employ fuzzy logic, neural networks, or other algorithm structures to convert the degradation data into the luminance correction factor.

The value of the luminance correction factor may allow the visible light to remain constant, regardless of the degradation in the pixel circuit 114. The value of the luminance correction factor may allow the luminance of degraded pixels not to be altered at all; instead, the luminance of the non-degraded pixels to be decreased. In this case, the entire display may gradually lose luminance over time, however the uniformity may be high.

The calculation of a luminance correction factor may be implemented in accordance with a compensation of non-uniformity algorithm, such as a constant brightness algorithm, a decreasing brightness algorithm, or combinations thereof. The constant brightness algorithm and the decreasing brightness algorithm may be implemented on the TFT-to-pixel circuit conversion algorithm module 134 or the digital data processor 106. The constant brightness algorithm is provided for increasing brightness of degraded pixels so as to match non-degraded pixels. The decreasing brightness algorithm is provided for decreasing brightness of non-degraded pixels so as to match degraded pixels. These algorithm may be implemented by the TFT-to-pixel circuit conversion algorithm module 134, the digital data processor 144, or combinations thereof. It is noted that these algorithms are examples only, and the compensation of non-uniformity algorithm is not limited to these algorithms.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A method of image correction for a display system included in a final product, the method comprising:
    downloading to the final product, initial correction data from a remote memory separate from the final product and storing the initial correction data in a memory store on the final product remote from the display system; and transmitting the initial correction data from the memory store to the display system and storing the initial correction data in a data store in the display system, for correcting the display system.

2. The method of according to claim 1, wherein the initial correction data comprise correction data determined to correct for initial non-uniformity of said display system.

3. The method according to claim 1, wherein the final product includes a video source;
   wherein the display system includes a digital data processor configured for capable of receiving luminance data from the video source over a video interface; and
   wherein the step of transmitting the initial correction data to the display system comprises transmitting the initial correction data over the video interface to a compensation processor in the digital data processor.

4. The method according to claim 3, wherein the display system includes the digital data processor and a data driver IC configured for receiving luminance data from the video source over the video interface;
   wherein the digital data processor includes a central processing unit and a graphics unit;
   wherein the compensation processor corrects the luminance data in digital form in the central processing unit or the graphics processing unit; and
   wherein transmitting the initial correction data to the display system comprises transmitting the initial correction data over the video interface to the compensation processor in the data driver IC.

5. The method according to claim 4, wherein the compensation processor corrects the luminance data in digital, voltage or current form in the data driver IC.

6. The method according to claim 3, wherein the initial correction data correction data determined to correct for initial non-uniformity of said display system including an integer value corresponding to each pixel in the display system, which are added by the compensation processor to luminance data from a video source in the final product to compensate for the initial non-uniformity.

7. The method according to claim 3, further comprising:
   determining degradation correction data for the display system to correct for degradation effects during use in the final product;
   storing the degradation correction data in the memory store in the final product;
   transmitting the degradation correction data from the memory store to the display system over the video interface for correcting the display system.

8. The method according to claim 7, wherein the step of determining the degradation correction data comprises determining a degradation of each thin film transistor in each pixel of the di splay system.

9. The method according to claim 7, wherein the step of determining the degradation correction data comprises determining degradation of each organic light emitting diode in each pixel of the di splay system.

10. The method according to claim 7, wherein the degradation correction data comprises an integer value corresponding to each pixel in the display system, which are added to the luminance data by the compensation processor to compensate for the degradation effects.

11. A display system including a plurality of pixels for use in a video displaying product, which includes a video source and a memory store including initial correction data for the display system to correct initial non-uniformity in the plurality of pixels, the display system comprising:

a plurality of pixel circuits, each including a thin film transistor (TFT) and a light-emitting diode (LED) for converting luminance data received from the video source into visible light; and a compensation processor configured for requesting the initial correction data from the memory store in the video display product remote from the display system, receiving the initial correction data from the memory store over a video interface; storing the initial correction data in a data store in the display system; and adjusting the luminance data to correct the display system using the initial correction data.

12. The display system according to claim 11, wherein the display system comprises a digital data processor for receiving the luminance data in digital form from the video source over the video interface, the digital data processor including a central processing unit and a graphics processing unit; and
   wherein the compensation processor is configured to correct the luminance data in digital form in the central processing unit or the graphics processing unit.

13. The display system according to claim 11, wherein the compensation processor is comprised in a data driver IC for converting luminance data received from the video source from digital form to voltage or current form.

14. The display system according to claim 13, wherein the compensation processor corrects the luminance data in voltage or current form in the data driver IC.

15. The display system according to claim 11, wherein the initial correction data comprises an integer value corresponding to each pixel in the display system, which are added to the luminance data by the compensation processor to compensate for the initial non-uniformity.

16. The display system according to claim 11, further comprising a compensation functions processor configured for:
   determining degradation correction data for the display system to correct for degradation effects during use in the video displaying product; and
   storing the degradation correction data in the memory store in the video displaying product;
   receiving the degradation correction data from the memory store for correcting the display system.

17. The display system according to claim 16, wherein the compensation functions processor is also configured for determining degradation of each thin film transistor in each pixel of the display system.

18. The display system according to claim 16, wherein the compensation functions processor is also configured for determining degradation of each organic light emitting diode in each pixel of the display system.

19. The display system according to claim 16, wherein the degradation correction data comprises an integer value corresponding to each pixel in the display system, which are added to the luminance data by the compensation processor to compensate for the degradation effects.

20. A video display product, comprising:
   a display system including a plurality of pixel circuits;
   a video source for transmitting luminance data to the display system;
   a user interface for inputting commands from a user;
   a control processor for controlling interaction between the user interface, the video source and the display system;
   wherein the display system comprises:
      the plurality of pixel circuits, each including a thin film transistor (TFT) and a light-emitting diode (LED) for converting the luminance data received from the video source into visible light; and a compensation processor configured for requesting initial correction data from a memory store in the video display product and remote from the display system, the initial correction data comprising data to correct initial non-uniformity in the plurality of pixel circuits; receiving at the display system the initial correction data from the memory store; storing the initial correction data in a data store in the display system; and adjusting the luminance data to correct the display system using the initial correction data.

* * * * *

UNITED STATES PATENT AND TRADEMARK OFFICE
CERTIFICATE OF CORRECTION

PATENT NO. : 11,410,614 B2
APPLICATION NO. : 16/927228
DATED : August 9, 2022
INVENTOR(S) : Nino Zahirovic and Shuenn-Jiun Tang It is certified that error appears in the above-identified patent and that said Letters Patent is hereby corrected as shown below:

In the Claims

Claim 8, Column 9, Line 53:
Please amend "...pixel of the di splay system." to read -- ...pixel of the display system. --

Claim 9, Column 9, Line 57:
Please amend "...in each pixel of the di splay system." to read -- ...in each pixel of the display system. --

Signed and Sealed this
Twenty-second Day of November, 2022

Katherine Kelly Vidal
*Director of the United States Patent and Trademark Office*